United States Patent
Kuester et al.

(10) Patent No.: US 10,543,787 B2
(45) Date of Patent: Jan. 28, 2020

(54) FULL DISPLAY MIRROR WITH RACK-AND-PINION ACTUATOR

(71) Applicant: Gentex Corporation, Zeeland, MI (US)

(72) Inventors: Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 626 days.

(21) Appl. No.: 15/053,233

(22) Filed: Feb. 25, 2016

(65) Prior Publication Data

US 2016/0250972 A1    Sep. 1, 2016

Related U.S. Application Data

(60) Provisional application No. 62/121,935, filed on Feb. 27, 2015.

(51) Int. Cl.
*B60R 1/12* (2006.01)
*G02B 27/01* (2006.01)
*H04N 5/225* (2006.01)
*B60R 1/04* (2006.01)

(52) U.S. Cl.
CPC ............. *B60R 1/12* (2013.01); *B60R 1/04* (2013.01); *G02B 27/0101* (2013.01); *H04N 5/2257* (2013.01); *B60R 2001/1253* (2013.01)

(58) Field of Classification Search
None
See application file for complete search history.

(56) References Cited

U.S. PATENT DOCUMENTS

| 3,421,728 | A | * | 1/1969 | Gordon | B60R 1/04 248/477 |
| 4,895,337 | A | * | 1/1990 | Oskam | B60R 1/04 248/487 |
| 5,969,870 | A |   | 10/1999 | Jain et al. | |
| 6,520,667 | B1 |  | 2/2003 | Mousseau | |

(Continued)

FOREIGN PATENT DOCUMENTS

EP    0202757 A2    4/1985

OTHER PUBLICATIONS

International Search Report and Written Opinion of the International Searching Authority, or the Declaration dated May 12, 2016 for International Application No. PCT/US2016/018956, filed on Feb. 22, 2016, 8 pages.

*Primary Examiner* — Anand S Rao
*Assistant Examiner* — Tyler B Edwards
(74) *Attorney, Agent, or Firm* — Price Heneveld LLP; Bradley D. Johnson

(57) ABSTRACT

A rearview mirror for a vehicle includes a housing defining an interior cavity and an open side, a substrate rigidly coupled within the open side of the housing and having a reflective surface thereon, and an actuation mechanism coupled within the housing. The actuation mechanism has a mounting plate rotatably coupled within the cavity of the housing at a first end of the mounting plate, a first gear rack being defined on a second end of the mounting plate, and a motor rigidly coupled within the interior cavity of the housing adjacent the second end of the mounting plate. The motor has a first pinion gear coupled with an output shaft thereof and in a mesh engagement with the gear rack.

20 Claims, 2 Drawing Sheets

(56) References Cited

U.S. PATENT DOCUMENTS

| | | |
|---|---|---|
| 6,648,477 B2 | 11/2003 | Hutzel et al. |
| 7,722,199 B2 * | 5/2010 | DeWard .................... B60R 1/04 248/481 |
| 2005/0068647 A1 * | 3/2005 | Brandt .................... B60R 1/081 359/877 |
| 2008/0055757 A1 | 3/2008 | Uken et al. |
| 2011/0176323 A1 | 7/2011 | Skiver et al. |
| 2013/0279014 A1 | 10/2013 | Fish, Jr. et al. |
| 2014/0347488 A1 | 11/2014 | Tazaki et al. |

* cited by examiner

FULL DISPLAY MIRROR WITH RACK-AND-PINION ACTUATOR

CROSS-REFERENCE TO RELATED APPLICATION

This application claims priority under 35 U.S.C. § 119(e) to U.S. Provisional Patent Application No. 62/121,935, filed on Feb. 27, 2015, entitled "FULL DISPLAY MIRROR WITH RACK-AND-PINION-ACTUATOR," the disclosure of which is hereby incorporated herein by reference in its entirety.

TECHNOLOGICAL FIELD

The present disclosure relates generally to a full-display rearview mirror for a motor vehicle and more particularly, relates to a mechanism for automatic movement of the display mirror substrate between active and inactive positions.

BACKGROUND

Automotive rearview mirrors including video displays therein may be referred to as full-display mirrors. Such mirrors may also include functionality as an ordinary, reflective rearview mirror that can be implemented as an alternative to the included video display, which can be done, for example, in response to a loss of power to the video display or the like. Incorporation of such functionality has been accomplished by including a reflective surface over the video display that is at least partially transparent such that the display is visible therethrough. To prevent the reflected image from interfering with the video image, when available, the mirror may be tilted upward, toward the vehicle headliner, such that the reflective image is less noticeable to the driver and. Such tilting has been implemented, for example, by use of a bi-modal lever that the driver can use to manually move the mirror between the upwardly-tilted position associated with video display use and a position whereby the reflective surface can be used in connection with the rearview mirror. Such mechanisms require manual input by the user and may give an undesirable appearance of an ordinary prism-mirror. Accordingly, further advances may be desired.

SUMMARY

According to one aspect of the present disclosure, a rearview mirror for a vehicle includes a housing defining an interior cavity and an open side, a substrate rigidly coupled within the open side of the housing and having a reflective surface thereon, and an actuation mechanism coupled within the housing. The actuation mechanism has a mounting plate rotatably coupled within the cavity of the housing at a first end of the mounting plate, a first gear rack being defined on a second end of the mounting plate, and a motor rigidly coupled within the interior cavity of the housing adjacent the second end of the mounting plate. The motor has a first pinion gear coupled with an output shaft thereof and in a mesh engagement with the gear rack.

According to another aspect of the present disclosure, a rear-vision system for a vehicle includes a video camera mounted on the vehicle in a position to capture an image of a portion of an exterior thereof and a display mirror. The display mirror has a housing defining an interior cavity and an open side, a substrate coupled over the open side of the housing and having a display in electronic communication with the camera for presenting the image thereon and a one-way reflective layer overlying the display, and an actuation mechanism operably coupled within the housing. The actuation mechanism has a mounting plate rotatably coupled within the cavity of the housing at a first end of the mounting plate, a first gear rack being defined on a second end of the mounting plate, and a motor rigidly coupled within the interior cavity of the housing adjacent the second end of the mounting plate. The motor has a first pinion gear coupled with an output shaft thereof and in a mesh engagement with the gear rack.

According to another aspect of the present disclosure, a vehicle includes a windshield, a headliner adjacent an upper edge of the windshield, and a mirror assembly. The mirror assembly has a substrate including a display and a one-way reflective layer overlying the display, a mounting plate rotatably coupled within the cavity of the housing at a first end of the mounting plate, a first gear rack being defined on a second end of the mounting plate, and a motor rigidly coupled within the interior cavity of the housing adjacent the second end of the mounting plate. The motor has a first pinion gear coupled with an output shaft thereof and in a mesh engagement with the gear rack.

These and other features, advantages, and objects of the present device will be further understood and appreciated by those skilled in the art upon studying the following specification, claims, and appended drawings.

DETAILED DESCRIPTION OF EMBODIMENTS

Figure 1:
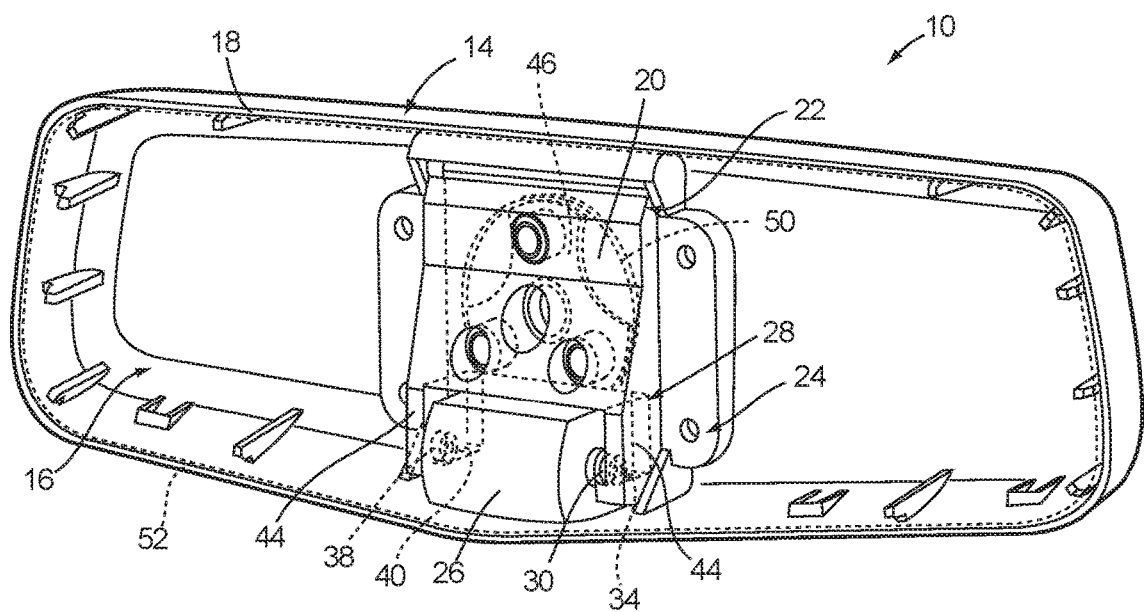
FIG. 1 is a front perspective view of a rearview mirror including an actuation mechanism for tilting a display substrate included therewith.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
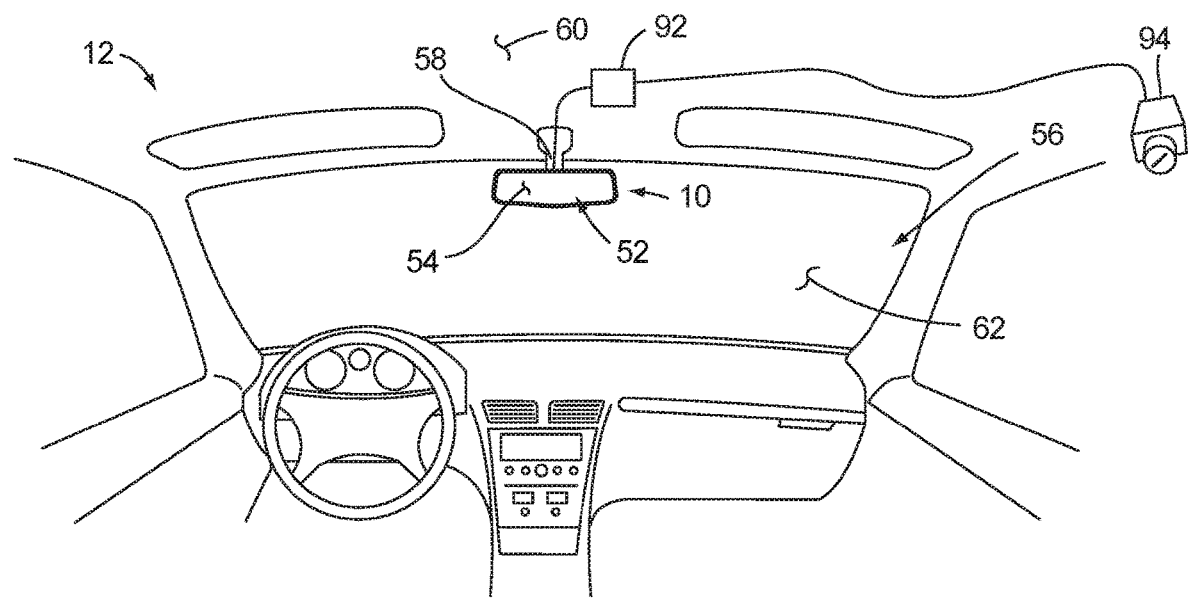
FIG. 2 is a perspective view of a portion of a vehicle interior including the rearview mirror of FIG. 1.

Referring now to FIG. 1, reference numeral 10 generally designates a rearview mirror for a vehicle 12 (of which the interior thereof is shown in FIG. 2). Rearview mirror 10 includes a housing 14 defining an interior cavity 16 and an open side 18 to the cavity 16. The rearview mirror 10 further includes an actuation mechanism 24 coupled within the housing 14 and having a mounting plate 20 rotatably coupled within the cavity 16 of the housing 14 at a first end 22 thereof. A first gear rack 34 is defined on a second end 28 of the mounting plate 20. The actuation mechanism 24 further has a motor 26 rigidly coupled within the interior cavity 16 of the housing 14 adjacent the second end 28 of the mounting plate 20. The motor 26 has a first pinion gear 30 coupled with an output shaft 32 thereof that is in a mesh engagement with the gear rack 34.

As shown in the Figures, the coupling of motor 26 with mounting plate 20 is achieved by the mesh engagement between pinion gear 30 and gear rack 34 such that motor 26 can drive movement of mounting plate 20 relative to housing 14, with which motor 26 is rigidly coupled. As shown, mirror 10 can include a second pinion gear 38 affixed on an end of output shaft 32 that extends on a side of motor 26 opposite pinion gear 30. Pinion gear 38 can be in a mesh arrangement with an additional gear rack 40 defined on second end 28 of mounting plate 20 on a side thereof opposite gear rack 34. In such an arrangement, gear racks 34 and 40 can be defined on respective extension arms 44 that define second end 28 of mounting plate 20. Extension arms 44 can be spaced apart so as to receive motor 26 therebetween and to facilitate position gear racks 34 and 40 in the above-noted mesh arrangement with pinion gears 30 and 38, given the location of motor 26 within housing 14 and the desired movement for mounting plate 20 with respect to housing 14, described further below.

As shown in FIG. 2, rearview mirror 10 can be used in connection with a vehicle interior 56. In one embodiment substrate 52 can include a video display along a portion or an entirety thereof such that rearview mirror is what may be referred to as a full-display mirror. A substrate 52 including such a display is referred to herein as "display substrate 52" and may be capable of displaying an image replicating that which would be available from a typical reflective mirror (which may be captured by an appropriately-positioned video camera, such as camera 94, or the like) when the display is in an active state. Such an image can be supplemented with other information presented on display substrate 52. In combination with such a display substrate 52, reflective surface 54 may be applied so as to overlie the display as a coating or separate element having properties to both provide a reflected image as well as to permit a video image of display substrate 52 to be visible therethrough in what may be referred to as a rear vision system.

The presence of reflective surface 54 permits substrate 52 to be used as a standard rearview mirror (i.e. without the need to view the displayed image) when the display is inactive, which may occur when the related vehicle 12 is not running or when power to the display substrate 52 is interrupted, for example. When in the active state, however, the presence of the reflective surface 54 over display substrate 52 can cause the image reflected by reflective surface 54 to compete with an image presented on display substrate 52. To alleviate such image competition, substrate 52 can be positioned such that reflective surface 54 reflects an image of the headliner 60 toward the driver. Because vehicle headliners are of generally consistent, non-reflective material, such an image may compete less with the video image of display substrate 52.

Rearview mirror 10, by way of the actuation mechanism 24, including mounting plate 20, pinion gears 30 and 38, and gear racks 34 and 40, can provide for automatic repositioning of the remainder of mirror 10 (i.e., housing 14 and display substrate 52) between an appropriate position thereof for use of reflective surface 54 when display substrate 52 is in the inactive state and for viewing of a displayed image, without undesirable competition, when display substrate 52 is in the active state.

Figure 3:
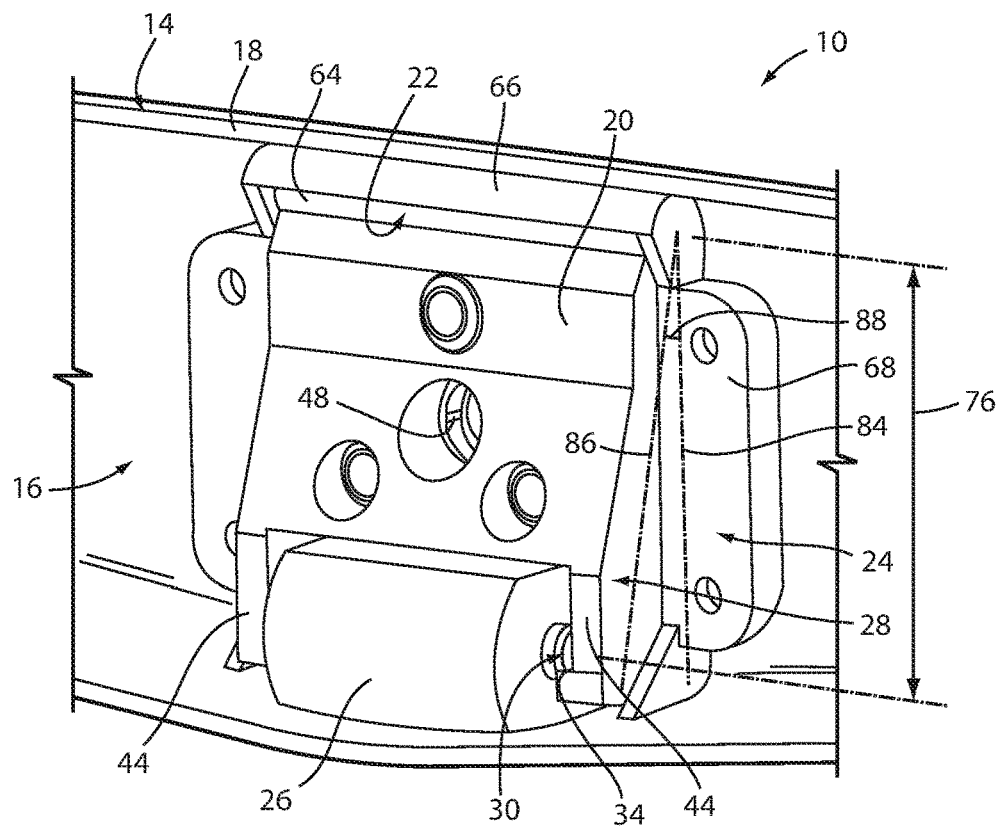
FIG. 3 is a front perspective detail view of the rearview mirror of FIG. 1 showing a portion of an actuation mechanism thereof.

To facilitate such movement, the above-described internal components of rearview mirror 10, including mounting plate 20, pinion gears 30 and 38, and gear racks 34 and 40 can move housing 14 by the above-described rotation of mounting plate 20 about first end 22 thereof. As shown in FIG. 3, mounting plate 20 can couple with a mounting base 46 or other structure that can be a portion of or otherwise coupleable with the mounting structure 58 used to mount rearview mirror 10 within vehicle 12. Housing 14 may have an aperture 50 positioned adjacent mounting plate 20 such that mounting base 46 can pass therethrough, thus allowing mounting plate 20 to couple with mounting structure 58 to retain rearview mirror 10 in an adjustable position with respect to windshield 62 or headliner 60. Accordingly, the above-described relative movement of mounting plate 20 with respect to housing 14 causes movement of housing 14 (and accordingly substrate 52 coupled therewith) in the form of rotation thereof about first end 22 of mounting plate 20. Such movement, in turn moves substrate 52 between the above-described active and inactive positions, according to whether or not display substrate 52 is in an off-state or an on-state.

Referring to FIG. 3, rearview mirror 10 is shown with mounting plate 20 positioned relative to housing 14 such that substrate 52 is in the active position. As shown, when mounting plate 20 is positioned as such, mounting plate 20 lies generally along line 84. Movement of rearview mirror into the inactive position can be achieved by rotation or mounting plate 20 relative to housing 14 such that mounting plate aligns with line 86. When display substrate 52 is inactive and mounting plate is in the corresponding inactive position, rearview mirror 10 can be manually moved to an appropriate position for use of reflective surface 54. Such movement can be done by the driver of vehicle 12 by movement of housing 14 about mounting structure 58, in a manner similar to that which is used for conventional rearview mirrors. Upon activation of the display substrate 52, rearview mirror 10, as described further below, can cause housing 14 and display substrate 52 to tilt upward with respect to housing 14 (by movement of mounting plate 20 relative to housing 14 to again align with line 84), thereby orienting reflective surface 54 toward headliner 60. Such orientation can be achieved by rotation of mounting plate 20 with respect to housing 14 through an angle 88 of about 6°, although such an angle can vary based on the location and structure of rearview mirror 10.

The movement of display substrate 52 by rearview mirror 10 can be achieved by rotation of pinion gear 30 (and, optionally, pinion gear 38) by rotation of output shaft 32 (FIG. 4), driven by motor 26, to move mounting plate 20 with respect to motor 26 and housing 14. Rotation of pinion gears 30 and 38 can be implemented automatically upon a change in the state (from active to inactive or vice versa) of display substrate 52. In an example, pinion gears 30 and 38 can be automatically rotated to cause movement of housing 14 and display substrate 52 from the active state (shown in FIG. 3) to the inactive state (i.e., aligning with line 86 in FIG. 3) upon a detected malfunction of display substrate 52 or powering down of vehicle 12. By the use of pinion gears 30 and 38 to move mounting plate 20 to achieve such positioning of substrate 52, housing 14 can be left in the selected position for off-state usage of rearview mirror 10, meaning that upon deactivation of display substrate 52, resulting in a return of substrate 52 to the position aligning with line 86, rearview mirror 10 may be in a generally acceptable position for inactive state usage thereof.

As described above, movement of housing 14 and substrate 52 can be achieved by the above-described operative coupling of motor 26 with second end 28 of mounting plate 20 by the mesh engagement of pinion gear 30 and gear rack 34 (and optionally pinion gear 38 and gear rack 40), in which rotational movement of pinion gear 30 about output shaft 32 moves second end 28 of mounting plate 20 in a generally outward or inward direction with respect to housing 14, thereby causing rotation of housing 14 and substrate 52 about first end 22 of mounting plate 20 upward or downward about mounting structure 58 with which mounting plate 20 is generally fixed.

Returning now to FIG. 1, housing 14 is shown in the form of a single-piece structure, which can be made to generally replicate the appearance of a standard rearview mirror, and can further be made from a single piece of injection molded plastic or the like, although other materials are possible. In an example, substrate 52 can be coupled directly to housing 14 over open end 18. In an alternative example, substrate 52 can be coupled with a bezel or other secondary housing piece (not shown) that can, in turn, be coupled with housing 14. In either example, housing 14 is structured so that interior cavity 16 is of a sufficient depth to retain internal structures thereof, including motor 26, actuation mechanism 24, and other related structures, as well as control circuitry for display substrate 52. Housing 14 is also structured such that open side 18 is sufficiently large to accept substrate 52 therein in a manner that, again, can replicate the appearance of a typical rearview mirror.

Mounting plate 20, as described above, is rotatably coupled with housing 14 at first end 22 thereof. Such coupling can be achieved by the incorporation of a first hinge portion 64 into first end 22 of mounting plate 20 and a mating second hinge portion 66 into insert 68, which is rigidly coupled within housing 14. Alternatively, hinge portion 66 can be integrally formed within interior cavity 16 of housing 14. As further shown in FIG. 1, mounting plate 20 can generally extend through a majority of a vertical height of housing 14 and can, further, be of a width sufficient to stably support the entirety of mirror 10, such as by attachment of mounting base 46 to a side of mounting plate 20 opposite substrate 52 with a portion of mounting base 46 or mounting structure 58 passing through the appropriately-sized aperture 50 in housing 14.

Figure 4:
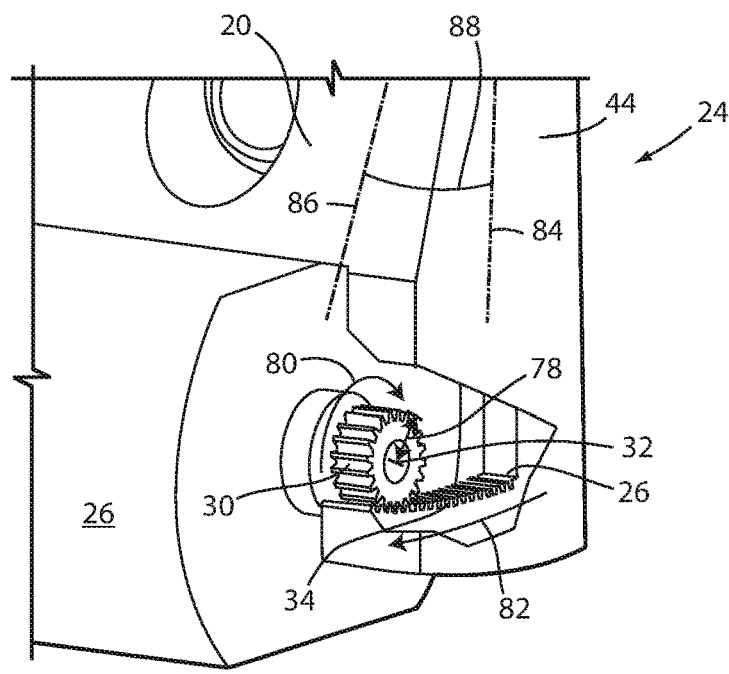
FIG. 4 is a front perspective view of a portion of the actuation mechanism of the rearview mirror of FIG. 1.

As shown in FIG. 4, the movement of mounting plate 20 achieved by actuation mechanism 24 by the operative coupling of second end 28 of mounting plate 20 to motor 26 by the mesh engagement of the pinion gears 30 and 38 with the gear racks 34 and 40 for motor 26 to apply a force on second end 28 of mounting plate 20 to cause rotation thereof about first end 22. The relative proportion of the radius 76 of gear racks 34 and 40 (which may generally correspond to the height of mounting plate 20) to the radius of pinion gears 30 and 38 dictates the amount of movement of mounting plate 20 relative to housing 14 achieved by rotation of output shaft 32. This not only affects the speed of such movement but the torque applied to mounting plate 20 by motor 26.

In particular, mounting plate 20, gear racks 34 an 40 and pinion gears 30 and 38 may be structured such that, as discussed above, rotational movement of mounting plate 20 relative to housing 14 through an angle of between about 5° and about 10° (and in an embodiment about 6°) is achieved by rotation of pinion gears 30 and 38 through about 1 revolution and about 1.5 revolutions, and in an embodiment about 1.25 revolutions. In such an arrangement, pinion gears 30 and 38 and gear racks 34 and 40 can be configured to have a ratio of between about 1:20 and about 1:60, depending on, for example, the torque and speed requirements for movement of rearview mirror 10. In an example, pinion gears 30 and 38 can have a radius 78 of between about 1 mm and about 3 mm and gear racks 34 and 40 can have a corresponding radius of between about 40 mm and about 60 mm and, in an embodiment, about 52 mm. Such a radius can be centered about the first end 22 of mounting plate 20.

As shown in FIGS. 3 and 4, the active position of mirror 10 can correspond to a positioning of mounting plate 20 along line 84. As discussed above, during movement of rearview mirror 10 out of the active position and into the inactive position indicated by line 86 in FIGS. 3 and 4, motor 26 is used to implement rotation of pinion gears 30 and 38 about output shaft 32, thereby causing rotation of mounting plate 20 by the mesh engagement of pinion gears 30 and 38 with gear racks 34 and 40. As shown in FIGS. 4 and 5, rotation of pinion gears 30 and 38 through between about 0.1 and 1 revolution in direction 80 can correspond to rotation of mounting plate 20 through a corresponding angle 88 of, for example, about 6° in direction 82 (which is generally perpendicular to substrate 52) to position mirror 10 in the inactive position, as shown in FIG. 5. At such an instance, rotation of pinion gears 30 and 38 can be stopped to maintain mirror 10 in the inactive position.

Such rotation of pinion gears 30 and 38 can be implemented by a controller 92, such as that which is depicted schematically in FIG. 2. Such a controller 92 can be positioned within mirror 10 or can be included in another system of vehicle 12, such as that which is associated with the rear vision system discussed above. Further, the rotation of pinion gears 30 and 38 can be implemented based on a calculation of the rotation thereof using the characteristics of the motor and the current applied thereto or can be controlled based on information received from one or more sensors within motor 26 or elsewhere within mirror 10. When movement of mirror 10 from the inactive state to the active state (FIG. 4) is desired, rotation of pinion gears 30 and 38 can be driven by motor 26 opposite to the direction 80 used to move mirror 10 from the active state to the inactive state.

In an embodiment motor 26 can be a 12 volt DC motor that can be configured to directly drive the rotation of pinion gears 30 and 38 or can include a reduction mechanism, as needed. Further, motor 26 can be controlled to rotate pinion gears 30 and 38 through the above-described motion in a period of about 2 seconds or less. In an embodiment, a control circuitry for motor 26 can be configured to move mirror 10 to the inactive position, if necessary, upon a loss of power thereto, which can include an unexpected loss of power or upon the associated vehicle 12 being turned off.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
a housing defining an interior cavity and an open side;
a substrate rigidly fixed to the housing over the open side thereof and having a reflective surface thereon; and
an actuation mechanism coupled within the housing and including:
a mounting plate defining a first end and a second end, the mounting plate being rotatably coupled within the interior cavity of the housing at the first end of the mounting plate with the housing and substrate being moveable with respect to the mounting plate, a first gear rack rigidly affixed with the mounting plate and fixedly extending therefrom in a position on the second end of mounting plate; and
a motor rigidly coupled within the interior cavity of the housing adjacent the second end of the mounting plate, the motor having a first pinion gear coupled with an output shaft thereof and in a mesh engagement with the gear rack to cause rotation of the housing about the first end of the mounting plate with rotation of the output shaft of the motor.

2. The rearview mirror of claim 1, wherein:
the mounting plate defines a body extending between the first end and the second end; and
the first gear rack fixedly extends from the second end of the first mounting plate along an arcuate path defined about a major axis extending through the first end of the mounting plate, the arcuate path maintaining the first pinion gear in the mesh engagement with the first gear rack during rotation of the output shaft of the motor causing rotation of the housing about the first end of the mounting plate.

3. The rearview mirror of claim 1, further including a mounting structure coupled with the mounting plate:
wherein rotation of the output shaft of the motor drives rotation of the mounting plate with respect to the housing, thereby causing the housing to rotate with respect to the mounting structure.

4. The rearview mirror of claim 1, further including a controller in electrical communication with the motor to cause the motor to drive rotation of the output shaft.

5. The rearview mirror of claim 1, wherein the housing rotates relative to the mounting plate through a first predetermined angle upon rotation of the first pinion gear through a second predetermined angle.

6. The rearview mirror of claim 5, wherein a ratio between the first gear rack and the first pinion gear is such that the first predetermined angle is between about 3 and 10 degrees when the second predetermined angle is between about 360 degrees and 540 degrees.

7. The rearview mirror of claim 6, wherein the first predetermined angle is about 6 degrees when the second predetermined angle is about 450 degrees.

8. The rearview mirror of claim 1, wherein:
the first gear rack is disposed on a first lateral side of the mounting plate;
the mounting plate further includes a second gear rack disposed on an opposite, second lateral side of the mounting plate on the second end thereof; and
the motor further has a second pinion gear coupled with the output shaft opposite the first pinion gear, the motor being disposed between the first and second gear racks.

9. The rearview mirror of claim 1, wherein the substrate includes a display screen, and wherein the reflective surface overlies the display screen.

10. A rear-vision system for a vehicle, comprising:
a video camera mounted on the vehicle in a position to capture an image of a portion of an exterior thereof; and
a display mirror, including:
a housing defining an interior cavity and an open side;
a substrate rigidly fixed to the housing over the open side thereof and having a display in electronic communication with the camera for presenting the image thereon and a one-way reflective layer overlying the display; and
an actuation mechanism operably coupled within the housing and including:
a mounting plate defining a first end and a second end, the mounting plate being rotatably coupled within the interior cavity of the housing at the first end of the mounting plate with the housing and substrate being moveable with respect to the mounting plate, a first gear rack rigidly affixed with the mounting plate and fixedly extending therefrom in a position on the second end of the mounting plate; and
a motor rigidly coupled within the interior cavity of the housing adjacent the second end of the mounting plate, the motor having a first pinion gear coupled with an output shaft thereof and in a mesh engagement with the gear rack to cause rotation of the housing about the first end of the mounting plate with rotation of the output shaft of the motor.

11. The system of claim 10, further comprising control circuitry coupled with the motor for controlling the motor in driving the rotation of the socket body, wherein:
the control circuitry is further in electronic communication with the display and automatically causes the rotation of the first pinion gear to move the housing between first and second positions upon one of an activation or deactivation of the display, respectively.

12. The system of claim 11, wherein when in the first position, the substrate is angled toward a headliner of the vehicle by between 5 degrees and 10 degrees relative to the second position.

13. The system of claim 10, wherein:
the mounting plate defines a body extending between the first end and the second end; and
the first gear rack fixedly extends from the second end of the first mounting plate along an arcuate path defined about a major axis extending through the first end of the mounting plate, the arcuate path maintaining the first pinion gear in the mesh engagement with the first gear rack during rotation of the output shaft of the motor causing rotation of the housing about the first end of the mounting plate.

14. The system of claim 10, wherein:
the first gear rack is disposed on a first lateral side of the mounting plate;
the mounting plate further includes a second gear rack disposed on an opposite, second lateral side of the mounting plate on the second end thereof; and
the motor further has a second pinion gear coupled with the output shaft opposite the first pinion gear.

15. A vehicle, comprising:
a windshield;
a headliner adjacent an upper edge of the windshield; and
a mirror assembly, comprising:
a substrate including a display and a one-way reflective layer overlying the display;

a mounting plate defining a first end and a second end, the mounting plate being rotatably coupled within the interior cavity of the housing at the first end of the mounting plate, a first gear rack rigidly affixed with the mounting plate and fixedly extending therefrom in a position on the second end of the mounting plate; and a motor rigidly coupled within the interior cavity of the housing adjacent the second end of the mounting plate, the motor having a first pinion gear coupled with an output shaft thereof and in a mesh engagement with the gear rack to cause rotation of the housing about the first end of the mounting plate with rotation of the output shaft of the motor.

16. The vehicle of claim 15, wherein rotation of the first pinion gear through a first angle causes rotation of the mounting plate about the first end between first and second positions.

17. The vehicle of claim 16, wherein when in the first position, the substrate is angled toward the headliner by between 5 degrees and 10 degrees relative to the second position.

18. The vehicle of claim 15, further comprising control circuitry coupled with the motor for controlling the motor in driving the rotation of the first pinion gear body, the control circuitry further being in electronic communication with the display and automatically causing the rotation of the first pinion gear to move the mounting plate between the first and second positions upon one of an activation or deactivation of the display, respectively.

19. The vehicle of claim 15, wherein:

the mounting plate defines a body extending between the first end and the second end; and the first gear rack fixedly extends from the second end of the first mounting plate along an arcuate path defined about a major axis extending through the first end of the mounting plate, the arcuate path maintaining the first pinion gear in the mesh engagement with the first gear rack during rotation of the output shaft of the motor causing rotation of the housing about the first end of the mounting plate.

20. The vehicle of claim 15, wherein:

wherein the housing rotates relative to the mounting plate through a first predetermined angle upon rotation of the first pinion gear through a second predetermined angle; and a ratio between the first gear rack and the first pinion gear are such that the first predetermined angle is about 6 degrees when the second predetermined angle is about 450 degrees.

* * * * *